US009166426B2

(12) United States Patent
Kamachi

(10) Patent No.: US 9,166,426 B2
(45) Date of Patent: Oct. 20, 2015

(54) EXTERNAL POWER SUPPLY APPARATUS OF ELECTRIC VEHICLE

(71) Applicant: MITSUBISHI JIDOSHA KOGYO KABUSHIKI KAISHA, Tokyo (JP)

(72) Inventor: Makoto Kamachi, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 160 days.

(21) Appl. No.: 13/954,092

(22) Filed: Jul. 30, 2013

(65) Prior Publication Data

US 2014/0035512 A1 Feb. 6, 2014

(30) Foreign Application Priority Data

Jul. 31, 2012 (JP) ................. 2012-169086

(51) Int. Cl.
*H02J 7/00* (2006.01)
*B60L 3/00* (2006.01)
*B60L 11/18* (2006.01)

(52) U.S. Cl.
CPC ............... *H02J 7/0042* (2013.01); *B60L 3/00* (2013.01); *B60L 11/1816* (2013.01); *B60L 2230/12* (2013.01); *Y02T 10/7005* (2013.01); *Y02T 10/7088* (2013.01); *Y02T 90/121* (2013.01); *Y02T 90/14* (2013.01)

(58) Field of Classification Search
CPC ..... Y02T 90/14; Y02T 90/128; Y02T 90/127; Y02T 10/7241; Y02T 90/12
USPC ....................................................... 320/104
See application file for complete search history.

(56) References Cited

U.S. PATENT DOCUMENTS

| 8,063,757 | B2 * | 11/2011 | Frey et al. | 340/455 |
| 8,125,324 | B2 * | 2/2012 | Frey et al. | 340/455 |
| 8,344,692 | B2 * | 1/2013 | Sakurai | 320/109 |
| 2009/0021364 | A1 * | 1/2009 | Frey et al. | 340/468 |
| 2010/0315040 | A1 * | 12/2010 | Sakurai | 320/109 |

(Continued)

FOREIGN PATENT DOCUMENTS

| CN | 102104593 A | 6/2011 |
| CN | 102244401 A | 11/2011 |

(Continued)

OTHER PUBLICATIONS

Chinese Office Action, issued Jul. 14, 2015, in corresponding Chinese Patent Application No. 201310326462.8 (with English translation).

*Primary Examiner* — Suchin Parihar
(74) *Attorney, Agent, or Firm* — Birch, Stewart, Kolasch & Birch, LLP

(57) ABSTRACT

An external power supply apparatus of an electric vehicle, includes: a battery; an inverter configured to convert DC power of the battery to AC power and configured to output the AC power; a first outlet socket disposed in the electric vehicle and through which an output of the inverter is supplied; a relay connected downstream from the first outlet socket as viewed from the inverter; a charging port connected downstream from the relay as viewed from the inverter and exposed to the outside of the electric vehicle; an adapter including a second outlet socket and being to be connected to the charging port; and, when it is detected that the adapter is connected to the charging port, a controlling unit setting the relay to an ON state to allow the output of the inverter to be supplied through the charging port.

5 Claims, 4 Drawing Sheets

(56) References Cited

U.S. PATENT DOCUMENTS

| | | |
|---|---|---|
| 2011/0144844 A1 | 6/2011 | Ishibashi |
| 2011/0282513 A1 | 11/2011 | Son et al. |
| 2011/0300753 A1 | 12/2011 | Ichikawa et al. |
| 2012/0025765 A1* | 2/2012 | Frey et al. .................... 320/109 |
| 2012/0187900 A1 | 7/2012 | Murawaka |
| 2012/0193983 A1 | 8/2012 | Yukizane et al. |
| 2013/0049684 A1* | 2/2013 | Kusch et al. ................. 320/109 |
| 2013/0187602 A1* | 7/2013 | Bouman ....................... 320/109 |
| 2013/0271075 A1* | 10/2013 | Restrepo et al. ............. 320/109 |
| 2013/0307489 A1* | 11/2013 | Kusch et al. ................. 320/162 |
| 2013/0335024 A1* | 12/2013 | Akai et al. .................... 320/109 |
| 2014/0217956 A1* | 8/2014 | Kinomura et al. ............ 320/101 |
| 2015/0057859 A1* | 2/2015 | Yamamoto et al. ............ 701/22 |

FOREIGN PATENT DOCUMENTS

| | | |
|---|---|---|
| CN | 102334244 A | 1/2012 |
| CN | 102481857 A | 5/2012 |
| CN | 102577022 A | 7/2012 |
| JP | 11-178241 A | 7/1999 |
| JP | 4781136 B2 | 9/2011 |
| JP | 2012-85406 A | 4/2012 |

* cited by examiner

EXTERNAL POWER SUPPLY APPARATUS OF ELECTRIC VEHICLE

CROSS-REFERENCE TO RELATED APPLICATION(S)

This application is based upon and claims the benefit of priority from prior Japanese patent application No. 2012-169086, filed on Jul. 31, 2012, the entire contents of which are incorporated herein by reference.

BACKGROUND

The present invention relates to an external power supply apparatus which is mounted on an electric vehicle, and which supplies electric power to an electric apparatus outside the vehicle.

In an electric vehicle such as an electric automobile or a hybrid vehicle, a system has been in practical use in which DC power of a high-voltage driving battery is converted to AC power, and the AC power is supplied to an electric apparatus in the vehicle through an accessory outlet socket disposed in the vehicle (for example, refer to JP-A-11-178241 and Japanese Patent No. 4,781,136).

In the above-described system, an outlet socket is not disposed on the exterior of the vehicle, and therefore it is not easy to supply electric power to an electric apparatus outside the vehicle. Even in the case where an outlet socket is disposed on the exterior of the vehicle, when the outlet socket is simply externally disposed, there is a risk of electrical shock or leakage. Although electric power can be supplied to an electric apparatus outside the vehicle through the accessory outlet socket disposed in the vehicle, the vehicle can travel in this state, and hence there is a possibility that an accident in which the electric apparatus is dragged may occur.

Therefore, it is requested to develop an external power supply apparatus which can supply electric power easily and safely to an electric apparatus outside a vehicle.

SUMMARY

It is an object of the invention to provide an external power supply apparatus which is mounted on an electric vehicle, and which supplies electric power easily and safely to an electric apparatus outside the vehicle.

In order to achieve the object, according to the invention, there is provided an external power supply apparatus of an electric vehicle, the external power supply apparatus comprising: a battery for driving the electric vehicle; an inverter which is configured to convert DC power of the battery to AC power, and which is configured to output the AC power; a first outlet socket which is disposed in the electric vehicle, and through which an output of the inverter is supplied; a relay which is connected downstream from the first outlet socket as viewed from the inverter, and which is configured to turn ON/OFF the output of the inverter; a charging port which is connected downstream from the relay as viewed from the inverter, and which is exposed to the outside of the electric vehicle; an adapter which includes a second outlet socket, and which is to be connected to the charging port; and a controlling unit which is configured to control the relay, When it is detected that the adapter is connected to the charging port, the controlling unit configured to set the relay to an ON state to allow the output of the inverter to be supplied through the charging port.

When it is detected that the adapter is connected to the charging port, the controlling unit may inhibit the vehicle from travelling.

A charging gun, which is configured to supply electric power of a home power supply through a charging cable, may be connectable to the charging port, and one end of the adapter may have a shape which is compatible with the charging gun, and the other end of the adapter may include the second outlet socket.

According to the invention, there is also provided an external power supply apparatus of an electric vehicle, the external power supply apparatus comprising: a battery for driving the electric vehicle; an inverter which is configured to convert DC power of the battery to AC power, and which is configured to output the AC power; a first outlet socket which is disposed in the electric vehicle, and through which an output of the inverter is supplied; a relay which is connected downstream from the first outlet socket as viewed from the inverter, and which is configured to turn ON/OFF the output of the inverter; a second outlet socket which is connected downstream from the relay as viewed from the inverter, and which is exposed to the outside of the electric vehicle; and a controlling unit which is configured to control the relay, when it is detected that an electric apparatus is connected to the second outlet socket, the controlling unit configured to set the relay to an ON state to allow the output of the inverter to be supplied through the second outlet socket.

DETAILED DESCRIPTION OF EXEMPLARY EMBODIMENTS

Hereinafter, an embodiment of the external power supply apparatus of an electric vehicle of the invention will be described with reference to FIGS. 1 to 3. In the following description, an electric automobile will be exemplarily described as the electric vehicle. However, the invention can be applied also to, for example, a hybrid vehicle which includes also an internal combustion engine.

(Embodiment 1)

Figure 1:
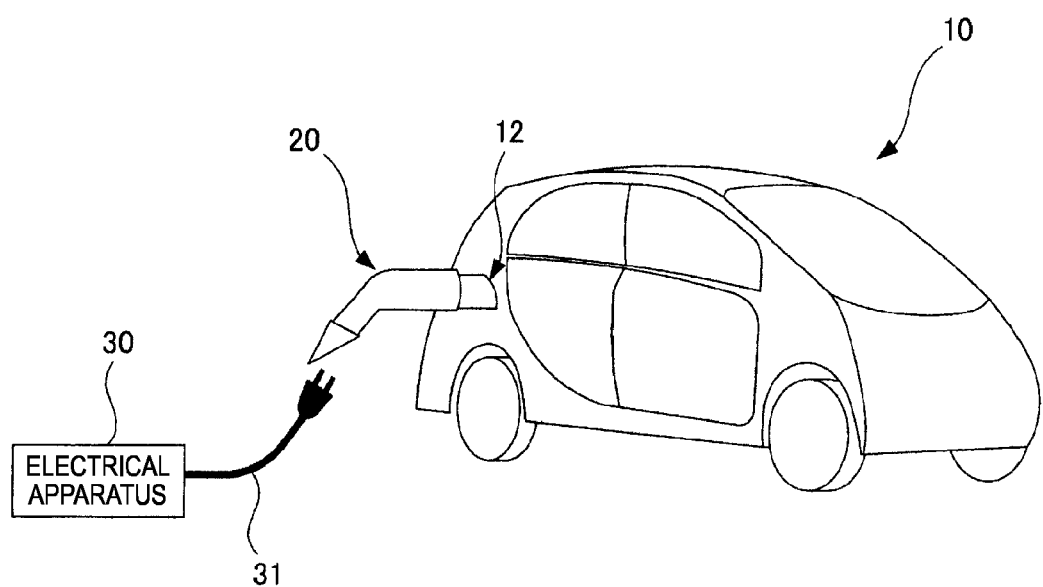
FIG. 1 is a diagram illustrating the external power supply apparatus of an electric vehicle of the invention.
Figure 2:
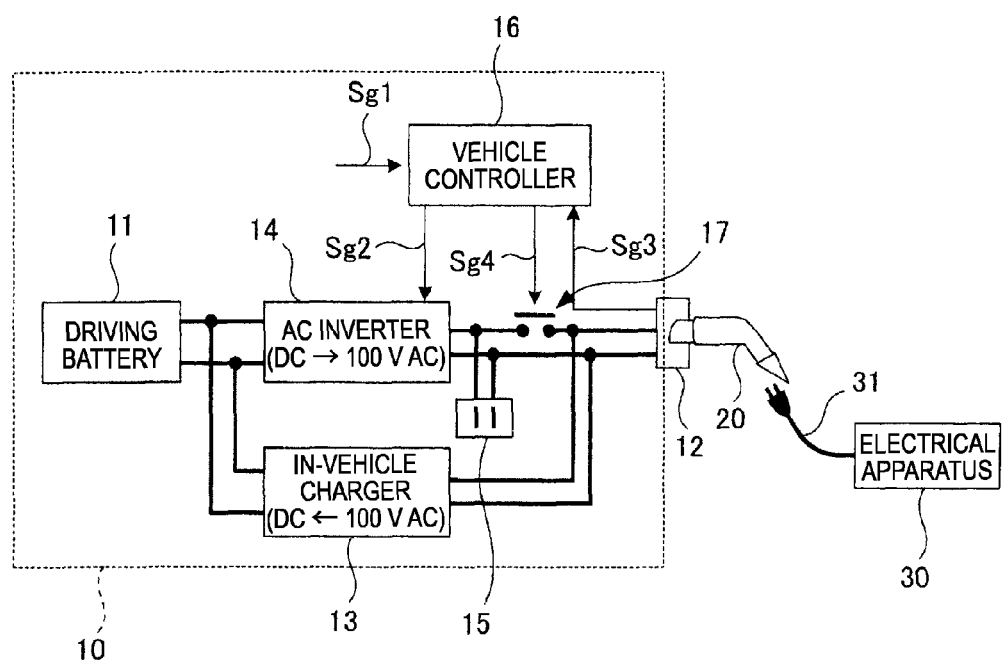
FIG. 2 is a block diagram illustrating an embodiment of the external power supply apparatus of an electric vehicle of the invention.
Figure 3:
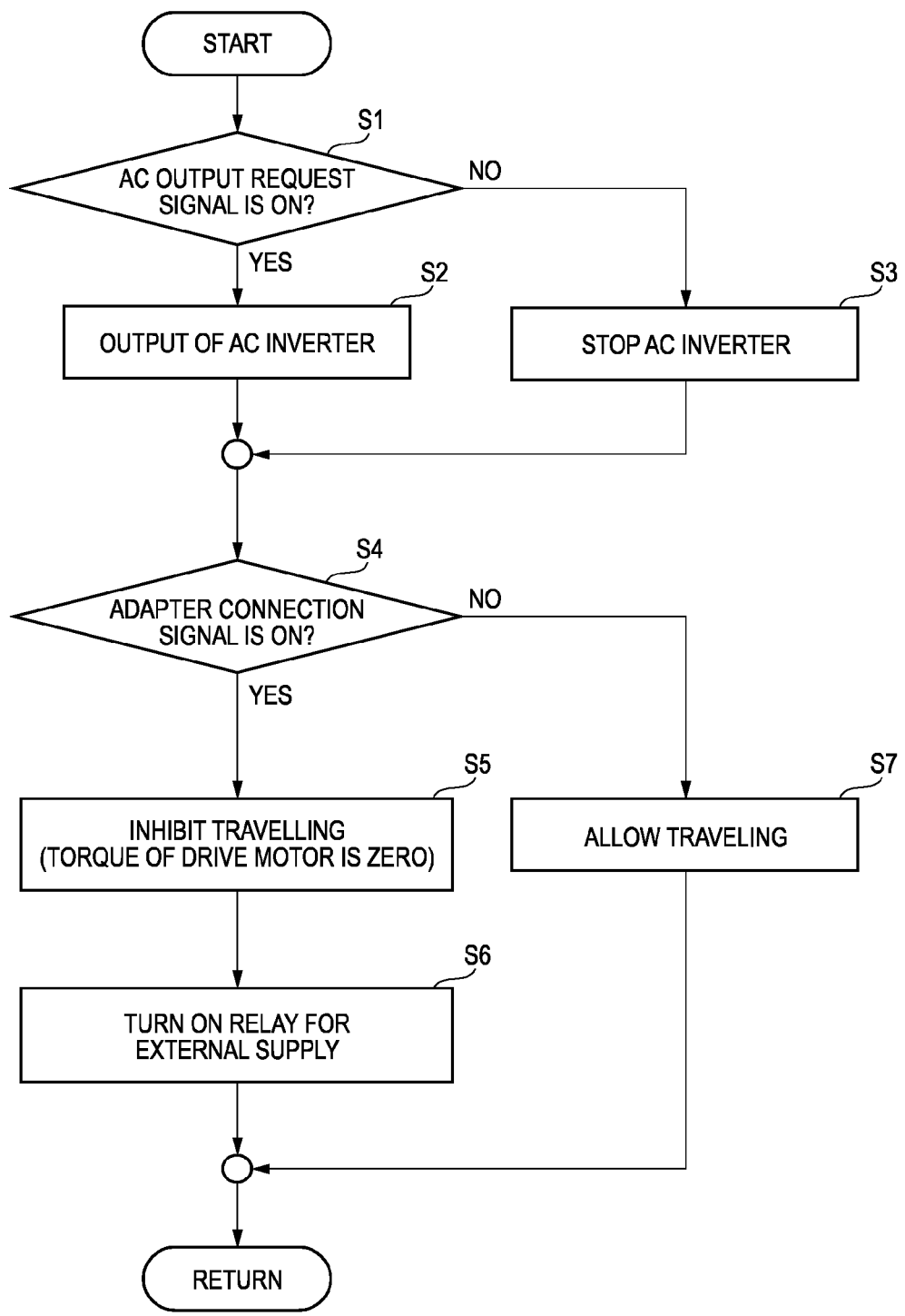
FIG. 3 is a flowchart illustrating the procedure which is executed in the external power supply apparatus of an electric vehicle of the invention.
Figure 4:
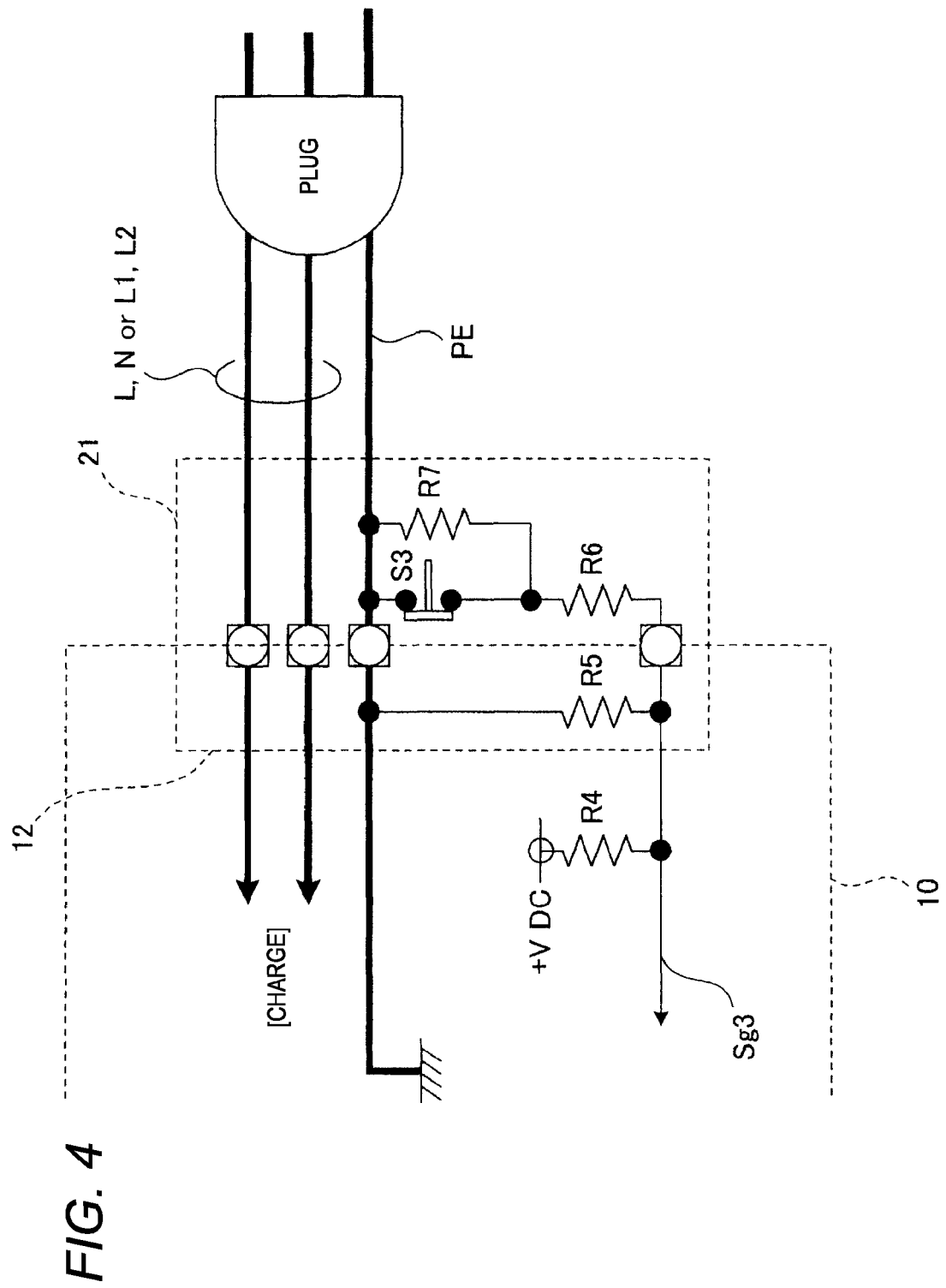
FIG. 4 is a circuit diagram illustrating a connection signal in a normal charging port shown in FIG. 2.

FIG. 1 is a diagram illustrating the external power supply apparatus of an electric vehicle of the embodiment, FIG. 2 is a block diagram illustrating the external power supply apparatus of an electric vehicle of the embodiment, FIG. 3 is a flowchart illustrating the procedure which is executed in the external power supply apparatus of an electric vehicle of the embodiment, and FIG. 4 is a circuit diagram illustrating a connection signal in a usual charging port shown in FIG. 2.

The vehicle 10 which is an electric automobile has a high-voltage driving battery 11 that is used for driving the vehicle, and a rapid charging port (not shown) and normal charging port 12 which are charging ports for supplying electric power to the driving battery 11. When charging of the driving battery 11 is to be performed through the normal charging port 12, a charging gun (not shown) which supplies electric power from a home power supply (for example, 100 V AC) through a charging cable is connected to the normal charging port 12, and an in-vehicle charger 13 disposed in the vehicle 10 converts 100 V AC to a DC voltage. The charging port in the invention means the normal charging port 12.

In the embodiment, when an electrical apparatus 30 which is outside the vehicle is to be connected, an adapter 20 which can be inserted into the normal charging port 12, namely the adapter 20 having one end which is formed into a shape that is compatible with the charging gun is used. A power supply cable 31 of the electrical apparatus 30 is connected to the adapter 20, and the external power supply apparatus of the embodiment shown in FIG. 2 is used, thereby enabling the power supply to the outside of the vehicle. Similarly with the charging gun, the adapter 20 has a watertight construction. The adapter 20 has an outlet socket (second outlet socket) to which an electrical apparatus is connectable, in the other end opposite to the one end which is formed into the shape that is compatible with the charging gun.

As shown in FIG. 2, in addition to the driving battery 11, the external power supply apparatus of an electric vehicle of the embodiment further has: an AC inverter 14 which converts the DC power of the driving battery 11 to AC power, and which outputs the AC power (for example, the inverter converts the DC voltage to 100 V AC, and outputs the AC voltage); a cabin outlet socket 15 (first outlet socket) which is disposed in the cabin of the vehicle 10, and through which the output of the AC inverter 14 is supplied; a relay 17 which is connected downstream from the cabin outlet socket 15 as viewed from the AC inverter 14, and which turns ON/OFF the output of the AC inverter 14; the normal charging port 12 which is connected downstream from the relay 17 as viewed from the AC inverter 14, which is exposed to the outside of the vehicle 10, and which supplies the output of the AC inverter 14; and a vehicle controller 16 (controlling unit) which controls the AC inverter 14, the relay 17, and the like. In other words, the cabin outlet socket 15 is connected to the AC inverter 14 and the relay 17, and is disposed between the AC inverter 14 and the relay 17. The relay 17 is connected to the AC inverter 14 and the normal charging port 12, and is disposed between the AC inverter 14 and the normal charging port 12.

In a related art, the output of the AC inverter 14 is supplied to the cabin outlet socket 15. The embodiment is configured so that the output can be further output also to the normal charging port 12 through the relay 17. In the case where the electrical apparatus 30 is to be connected to the normal charging port 12, i.e., the case where the electrical apparatus 30 is to be connected through the adapter 20, the normal charging port 12 for charging is caused by the following procedures to function also as an out-vehicle outlet socket for supplying.

Hereinafter, the procedures for using the normal charging port 12 for charging as an out-vehicle outlet socket for supplying will be described with reference to the flowchart shown in FIG. 3 together with the block diagram shown in FIG. 2.

The vehicle controller 16 checks whether an AC output request signal Sg1 is in the ON state or not (step S1). If the signal is in the ON state, the process proceeds to step S2, and, if not in the ON state (if the signal is in the OFF state), the process proceeds to step S3. When the driver operates an AC output request switch (not shown) which is disposed in the vehicle 10, the AC output request signal Sg1 is transmitted to the vehicle controller 16.

If the AC output request signal Sg1 is in the ON state, the vehicle controller 16 transmits an AC inverter drive signal Sg2 to the AC inverter 14 to drive the AC inverter 14, thereby causing the AC inverter 14 to perform an output operation (step S2). Namely, the AC inverter 14 converts the DC voltage of the driving battery 11 to 100 V AC, and outputs the AC voltage. At this time, the output of the AC inverter 14 can be basically supplied through the cabin outlet socket 15. When the AC output request signal Sg1 is set to be in the ON state by the AC output request switch, namely, it is possible to always supply the output of the AC inverter 14 through the cabin outlet socket 15.

By contrast, if the AC output request signal Sg1 is not in the ON state, the AC inverter drive signal Sg2 is not transmitted from the vehicle controller 16 to the AC inverter 14, and therefore the AC inverter 14 maintains the stop state so that the power supply from the cabin outlet socket 15 cannot be performed (step S3).

Next, the vehicle controller 16 checks whether a connection signal Sg3 is in the ON state or not (step S4). If the signal is in the ON state, i.e., if the adapter 20 is connected to the normal charging port 12, the process proceeds to steps S5 and S6. If the signal is not in the ON state (if the signal is in the OFF state), i.e., if the adapter 20 is not connected to the normal charging port 12, the process proceeds to step S7. The normal charging port 12 is configured so that, when the adapter 20 is connected to the normal charging port 12, the connection signal Sg3 is set to the ON state by, for example, a switch disposed in the normal charging port 12. According to the configuration, it is possible to check whether the adapter 20 is connected to the normal charging port 12 or not.

If the adapter 20 is connected to the normal charging port 12, the vehicle 10 is inhibited from traveling by setting the torque of a drive motor to zero (step S5), and the vehicle controller 16 transmits a relay drive signal Sg4 to the relay 17 so that the relay 17 is set to the ON state, and the AC inverter 14 is electrically connected to the normal charging port 12 for supplying electric power to the outside (step S6). Namely, travel during the connection of the adapter 20 to the normal charging port 12 is inhibited, and the output of the AC inverter 14 can be supplied through both the cabin outlet socket 15 and the normal charging port 12. As a result, in the case where the AC inverter 14 is driven, the electric power can be safely supplied to the electrical apparatus 30 which is connected to the adapter 20, and which is outside the vehicle.

By contrast, if the adapter 20 is not connected to the normal charging port 12, there is no possibility that an accident in which the electric apparatus 30 outside the vehicle is dragged may occur, and therefore the vehicle 10 is allowed to travel (step S7). At this time, the relay 17 maintains the OFF state. Even when the AC inverter 14 is driven, therefore, the output of the AC inverter 14 can be supplied only through the cabin outlet socket 15, and is not supplied to the normal charging port 12, whereby an accident such as electrical shock or leakage can be prevented from occurring.

In the embodiment, when the adapter 20 is connected to the normal charging port 12 of the vehicle 10, therefore, the AC power can be easily supplied to the electric apparatus 30 outside the vehicle. At this time, only when it is detected that the adapter 20 is connected to the normal charging port 12, the AC power is supplied through the normal charging port 12. Therefore, the AC power can be easily supplied to the electric apparatus 30 outside the vehicle, and an accident such as electrical shock or leakage can be prevented from occurring. When it is detected that the adapter 20 is connected to the normal charging port 12, the vehicle 10 is inhibited from travelling, whereby an accident in which the electric apparatus 30 is dragged can be prevented from occurring. Moreover, the normal charging port 12 of the vehicle 10 is caused to function also as an outlet socket for supplying electric power to the outside of the vehicle, and the adapter 20 having a shape that is compatible with the charging gun is used in the connection to the normal charging port 12. Therefore, the electric power can be easily supplied to the electric apparatus 30 outside the vehicle without largely modifying the apparatus configuration. The determination in step S4 is performed irrespective of that in step S2, i.e., the driving or non-driving of the AC inverter 14. In the case where the AC inverter 14 is not driven, when the adapter 20 is connected to the adapter 20, therefore, the vehicle 10 is inhibited from travelling, so that an accident such as dragging of the electric apparatus 30 can be prevented from occurring.

The switch disposed in the normal charging port 12 may be configured so as to distinctively detect the charging gun and adapter 20 through which the home power supply is supplied. In the configuration where the charging gun and the adapter 20 can be distinguished from each other, when the charging gun is connected in the state where the AC inverter 14 is driven, the relay 17 is not driven (is in the OFF state), and therefore the charging operation from the charging gun, and the power supplying operation from the AC inverter 14 are not simultaneously performed through the normal charging port 12. The cabin outlet socket 15 can be used while the driving battery 11 is charged from the charging gun.

The circuit diagram of FIG. 4 shows a specific example of the above-described configuration. FIG. 4 shows the state where the charging gun 21 is connected to the normal charging port 12. With respect to a ground line PE, resistors R4, R5 are disposed on the side of the vehicle 10, and a switch S3 and resistors R6, R7 are disposed on the side of the charging gun. The vehicle controller 16 detects a divided voltage (connection signal Sg3) produced by dividing a reference voltage VDC by the resistors R4 to R7, thereby detecting the connection of the charging gun 21. When the charging gun 21 is not connected, for example, the non-connection of the charging gun 21 is detected by detecting a divided voltage produced by the resistors R4, R5. When the charging gun 21 is connected, the connection of the charging gun 21 is detected by detecting a divided voltage produced by the resistors R4, R5, R6. The switch S3 is turned ON when the charging gun 21 is connected, and turned OFF when a cancelation button (not shown) of the charging gun 21 is depressed. In the case of depression, when the divided voltage produced by the resistors R4 to R7 is detected, the charging operation is stopped in the state where the charging gun 21 is connected.

Similarly with the charging gun 21, the adapter 20 includes a switch S3 and resistors R6, R7 (these components are not shown). The resistors R6, R7 of the adapter 20 may be set to have values which are different from those of the resistors R6, R7 of the charging gun 21. In this case, when the adapter 20 is connected, the vehicle controller 16 detects a divided voltage (connection signal Sg3) different from that produced when the charging gun 21 is connected. Therefore, it is possible to distinct the connection of the adapter 20 from that of the charging gun 21.

Even in the case where the driving battery 11 is rapidly charged, when the AC output request signal Sg1 is set to be in the ON state by the AC output request switch, and the connection signal Sg3 is set to the ON state by connecting the adapter 20 to the normal charging port 12, the AC power may be supplied to the electrical apparatus 30 disposed outside the vehicle, through the normal charging port 12 and the adapter 20.

In the above-described embodiment, an electric automobile has been exemplarily shown. Also a hybrid vehicle includes a driving battery, an AC inverter, a cabin outlet socket, and a vehicle controller. When the above-described relay, and an out-vehicle outlet socket (second outlet socket) which is an alternative to the normal charging port are further disposed in a hybrid vehicle, the embodiment can be applied without change to the configuration of the hybrid vehicle. In this case, when a power supply cable of an electric apparatus is connected to the out-vehicle outlet socket directly or indirectly through a conversion plug, the connection is detected, and the relay is set to the ON state to supply the AC power to the electric apparatus.

According to an aspect of the invention, only when it is detected that the adapter is connected to the charging port which is exposed to the outside of the vehicle, electric power is supplied through the charging port. Therefore, electric power can be easily supplied to an electric apparatus outside the vehicle, and an accident such as electrical shock or leakage can be prevented from occurring.

According to an aspect of the invention, when it is detected that the adapter is connected to the charging port which is exposed to the outside of the vehicle, the electric vehicle is inhibited from travelling, and therefore the vehicle can be prevented from travelling while the adaptor remains to be connected to the charging port.

According to an aspect of the invention, the apparatus is used while the adapter in which one end is formed into a shape that is compatible with the charging gun, and which has the second outlet socket in the other end is connected to the charging port. Therefore, electric power can be easily supplied to an electric apparatus outside the vehicle without largely modifying the apparatus configuration.

According to an aspect of the invention, only when it is detected that an electric apparatus is connected to the second outlet socket which is exposed to the outside of the vehicle, electric power is supplied through the second outlet socket. Therefore, electric power can be easily supplied to an electric apparatus outside the vehicle, and an accident such as electrical shock or leakage can be prevented from occurring.

The invention is preferred as an external power supply apparatus which, in an electric vehicle such as an electric automobile or a hybrid vehicle, supplies electric power to an external electric apparatus.

What is claimed is:

1. An external power supply apparatus of an electric vehicle, the external power supply apparatus comprising:
   a battery for driving the electric vehicle;
   an inverter which is configured to convert DC power of the battery to AC power, and which is configured to output the AC power;
   a first outlet socket which is disposed in the electric vehicle, and through which an output of the inverter is supplied;
   a relay which is connected downstream from the first outlet socket as viewed from the inverter, and which is configured to turn ON/OFF the output of the inverter;
   a charging port which is connected downstream from the relay as viewed from the inverter, and which is exposed to the outside of the electric vehicle;
   an adapter which includes a second outlet socket, and which is to be connected to the charging port; and
   a controlling unit which is configured to control the relay, wherein when it is detected that the adapter is connected to the charging port, the controlling unit is configured to set the relay to an ON state to allow the output of the inverter to be supplied through the charging port to an electric apparatus outside the electric vehicle.

2. The external power supply apparatus according to claim 1, wherein a charging gun, which is configured to supply electric power of a home power supply through a charging cable, is connectable to the charging port, and one end of the adapter has a shape which is compatible with the charging gun, and the other end of the adapter includes the second outlet socket.

3. The external power supply apparatus according to claim 1, wherein, when it is detected that the adapter is connected to the charging port, the controlling unit inhibits the vehicle from travelling.

4. The external power supply apparatus according to claim 3, wherein a charging gun, which is configured to supply electric power of a home power supply through a charging cable, is connectable to the charging port, and one end of the adapter has a shape which is compatible with the charging gun, and the other end of the adapter includes the second outlet socket.

5. An external power supply apparatus of an electric vehicle, the external power supply apparatus comprising:

a battery for driving the electric vehicle;

an inverter which is configured to convert DC power of the battery to AC power, and which is configured to output the AC power;

a first outlet socket which is disposed in the electric vehicle, and through which an output of the inverter is supplied;

a relay which is connected downstream from the first outlet socket as viewed from the inverter, and which is configured to turn ON/OFF the output of the inverter;

a second outlet socket which is connected downstream from the relay as viewed from the inverter, and which is exposed to the outside of the electric vehicle; and a controlling unit which is configured to control the relay, when it is detected that an electric apparatus outside the electric vehicle is connected to the second outlet socket, the controlling unit configured to set the relay to an ON state to allow the output of the inverter to be supplied through the second outlet socket to the electric apparatus.

\* \* \* \* \*